United States Patent
Duggal et al.

(10) Patent No.: US 12,230,752 B2
(45) Date of Patent: Feb. 18, 2025

(54) SOLID STATE BATTERY, CERAMIC ELECTROLYTE STRUCTURE AND METHODS OF MAKING

(71) Applicant: General Electric Company, Schenectady, NY (US)

(72) Inventors: Anil Raj Duggal, Niskayuna, NY (US); Hongyi Zhou, Niskayuna, NY (US); Hongbo Cao, Cohoes, NY (US); Oltea Puica Siclovan, Rexford, NY (US); Kevin Henry Janora, Schenectady, NY (US); Holly Ann Comanzo, Niskayuna, NY (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 681 days.

(21) Appl. No.: 16/876,825

(22) Filed: May 18, 2020

(65) Prior Publication Data
US 2021/0359338 A1    Nov. 18, 2021

(51) Int. Cl.
*H01M 10/0525* (2010.01)
*H01M 10/0562* (2010.01)

(52) U.S. Cl.
CPC ... *H01M 10/0562* (2013.01); *H01M 10/0525* (2013.01); *H01M 2300/0071* (2013.01)

(58) Field of Classification Search
CPC ......... H01M 10/0525; H01M 10/0562; H01M 2300/0071
See application file for complete search history.

(56) References Cited

U.S. PATENT DOCUMENTS

| | | | |
|---|---|---|---|
| 7,824,795 B2 | 11/2010 | Yoshida et al. | |
| 8,349,510 B2 | 1/2013 | Sarkar et al. | |
| 8,652,689 B2 | 2/2014 | Yerramalli et al. | |
| 2008/0102337 A1 | 5/2008 | Shimada | |
| 2010/0035141 A1* | 2/2010 | Grosvenor | H01M 10/056 429/129 |
| 2019/0273258 A1 | 9/2019 | Thomas-Alyea et al. | |

(Continued)

FOREIGN PATENT DOCUMENTS

| | | |
|---|---|---|
| CN | 108666613 A | 10/2018 |
| WO | 2017116599 A2 | 7/2017 |

(Continued)

OTHER PUBLICATIONS

International Search Report and Written Opinion issued in International Application No. PCT/US2021/0574043, mailed Jul. 20, 2022, 12 pages.

(Continued)

*Primary Examiner* — Osei K Amponsah
(74) *Attorney, Agent, or Firm* — Armstrong Teasdale LLP (57) ABSTRACT

A porous electrolyte structure for a solid state battery is provided. The porous electrolyte structure has an interconnected ceramic matrix with a network of open pores disposed throughout a thickness of the porous electrolyte structure. The porous electrolyte structure includes a porosity of about 20% by volume to about 80% by volume. A solid (Continued)

state battery cell including the porous electrolyte structure and a method of making the solid state battery cell are also provided.

21 Claims, 8 Drawing Sheets

(56) References Cited

U.S. PATENT DOCUMENTS

| | | | |
|---|---|---|---|
| 2019/0280330 A1 | 9/2019 | Albano | |
| 2020/0083562 A1* | 3/2020 | Kim | H01M 50/403 |
| 2020/0243870 A1* | 7/2020 | Wachsman | H01M 10/0565 |
| 2021/0359338 A1 | 11/2021 | Duggal et al. | |

FOREIGN PATENT DOCUMENTS

| | | |
|---|---|---|
| WO | 2018089430 A1 | 5/2018 |
| WO | 2019121340 A1 | 6/2019 |

OTHER PUBLICATIONS

Kotobuki et al., "A Novel Structure of Ceramics Electrolyte for Future Lithium Battery", Journal of Power Sources, vol. 196, Issue: 22, pp. 9815-9819, Nov. 15, 2011.

Kian et al., "Review-Practical Challenges Hindering the Development of Solid State Li Ion Batteries", Journal of The Electrochemical Society, vol. 164, Issue: 7, pp. A1731-A1744, Jun. 9, 2017.

Li et al., "Nanoporous Adsorption Effect on Alteration of the Li+ Diffusion Pathway by a Highly Ordered Porous Electrolyte Additive for High-Rate All-Solid-State Lithium Metal Batteries", ACS Publications, Jun. 19, 2018.

Quan et al., "Elastic and Li-Ion-Percolating Hybrid Membrane Stabilizes Li Metal Plating", Proceedings of the National Academy of Sciences of the United States of America, vol. 115, Issue: 49, pp. 12389-12394, Nov. 19, 2018.

Nitta et al., "Li-ion battery materials: present and future." Materials today 18, No. 5 (2015): 252-264.

Zheng, F. et al., "Review on solid electrolytes for all-solid-state lithium-ion batteries." Journal of Power Sources 389 (2018): 198-213.

* cited by examiner

SOLID STATE BATTERY, CERAMIC ELECTROLYTE STRUCTURE AND METHODS OF MAKING

BACKGROUND

The field of the disclosure relates to solid state batteries and more particularly, to solid state batteries with ceramic electrolyte structures.

Rechargeable lithium ion batteries have a high energy density and are a good energy storage system for a wide range of applications. However, lithium ion batteries have a flammable liquid electrolyte, which can cause the battery to ignite or explode if there is leakage of the electrolyte.

Lithium metal batteries have a higher theoretical capacity than conventional lithium ion batteries with a graphite-based anode; however, as a lithium metal anode is not chemically compatible with most liquid electrolytes, a solid state electrolyte is used.

Solid state electrolytes (SSEs), such as ceramic-based electrolytes, are a desirable alternative for use in a lithium metal battery system. They provide greater safety, as the electrolyte is a non-flammable solid and will not ignite, and have the potential to provide high energy density at a lower cost.

However, most ceramic-based SSEs only work in batteries under low current densities, which result in long charge times. At higher current densities, a fully ceramic battery undergoes fatigue and fracture, due to volume changes as lithium is deposited and stripped during battery cycling. In addition, there are often small gaps and voids between the solid electrolyte and current collector, which creates a stress concentration and is associated with the formation of lithium dendrites. As lithium-metal dendrites form, they penetrate through the solid ceramic electrolyte and eventually cause an electrical short, which renders the battery inoperable.

A typical solid state battery (SSB) is formed of a thick dense ceramic-based electrolyte. The ceramic-based SSE is manufactured separately and sintered to provide full density or close to full density with no porosity before being added to the battery as an input material. The thickness of the SSE is dictated by the need to maintain structural integrity during the manufacturing process and is generally greater than 100 micrometers. The large thickness of the SSE reduces the energy density of the battery and separate processing of the SSE adds to manufacturing costs.

Accordingly, an improved ceramic-based solid state electrolyte and battery with a reduced tendency for dendrites to form at high current density charging is desirable. Further, is an improved solid state battery with increased energy density for optimal performance, and an improved process for making solid state batteries having a ceramic-based solid electrolyte with reduced manufacturing costs are also desirable.

BRIEF DESCRIPTION

The present disclosure overcomes the problems inherent in the art and provides an improved ceramic-based solid electrolyte structure for a solid state battery with increased safety that can reduce metal dendrite formation at high current densities and provide a solid state battery with higher energy density and reduced manufacturing cost.

In a first aspect, a porous electrolyte structure for a solid state battery is provided. The porous electrolyte structure has a thickness and an interconnected ceramic matrix with a network of open pores disposed throughout the thickness of the porous electrolyte structure. The porous electrolyte structure includes a porosity of about 20% by volume to about 80% by volume.

In another aspect, a solid state battery cell includes a cathode, an anode and a porous electrolyte structure disposed between the cathode and the anode. The porous electrolyte structure having a thickness and an interconnected ceramic matrix with a network of open pores disposed throughout the thickness of the porous electrolyte structure. The porous electrolyte structure includes a porosity of about 20% by volume to about 80% by volume.

In yet another aspect, a method for producing a solid state battery cell is provided. The method includes forming a porous electrolyte structure having a thickness and an interconnected ceramic matrix with a network of open pores disposed throughout the thickness of the porous electrolyte structure and inserting the porous electrolyte structure between an anode and a cathode. The porous electrolyte structure includes a porosity of about 20% by volume to about 80% by volume.

The various aspects of the disclosure provide improved solid state electrolytes and batteries having higher current densities with reduced dendrite formation, high energy density, increased safety and reduced cost.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

DETAILED DESCRIPTION

The following detailed description and examples set forth example materials and procedures used in accordance with the present disclosure. It is to be understood, however, that this description and these examples are provided by way of illustration only, and nothing therein shall be deemed to be a limitation upon the overall scope of the present disclosure.

The singular forms "a", "an" and "the" include plural referents unless the context clearly dictates otherwise. The endpoints of all ranges reciting the same characteristic are independently combinable and inclusive of the recited endpoint. All references are incorporated herein by reference.

The modifier "about" used in connection with a quantity is inclusive of the stated value and has the meaning dictated by the context (e.g., includes the tolerance ranges associated with measurement of the particular quantity). Where ranges are disclosed, the endpoints of all ranges directed to the same component or property are inclusive, independently combinable and include all intermediate values of the ranges.

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

Terms "first", "second", and the like, as used herein do not denote any order, quantity or importance, but rather are used to distinguish one element from another. Also, the terms "front", "back", "bottom" and/or "top", unless otherwise noted, are merely used for convenience of description, and are not limited to any one position or spatial orientation.

Unless noted otherwise, all porosity measurements provided for the electrolyte structure are based on the volume of the porous electrolyte structure. The term "porosity" by volume used herein refers to a value estimated by measuring the density of the porous electrolyte structure ($\rho$) and comparing it with the density of a 100% dense electrolyte structure based on the theoretical density ($\rho d$) of the same solid electrolyte material according to equation 1. [eq. 1: Porosity=$1-\rho/\rho d$]. Porosity may also be measured experimentally by porometry.

The various aspects of the disclosure provide improved ceramic solid state electrolytes and solid state batteries with ceramic solid state electrolytes having higher current densities with reduced dendrite formation, high energy density, increased safety and reduced cost.

In one aspect, a solid state battery cell includes a cathode, an anode and a porous electrolyte structure disposed between the cathode and the anode. The porous electrolyte structure having a thickness and an interconnected ceramic matrix with a network of open pores disposed throughout the thickness of the porous electrolyte structure. The porous electrolyte structure including a porosity of about 20% by volume to about 80% by volume.

A solid state battery cell includes an anode or negative electrode, a cathode or positive electrode and a solid electrolyte structure or solid ionic conductor situated between the electrodes for conducting ions between the cathode and anode. In one aspect, the solid electrolyte structure is a ceramic material and is configured to move ions while resisting the flow of electrons, which allows electrons to move outside the battery.

Figure 1A:
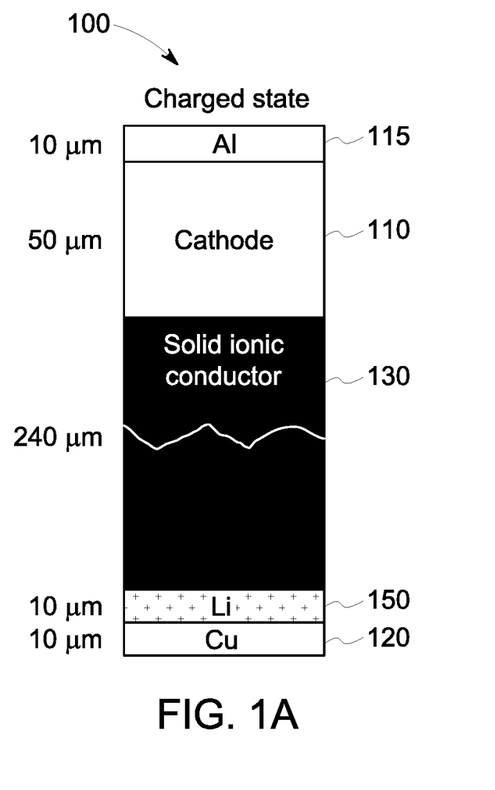
FIG. 1A is a schematic drawing of a conventional solid state battery in a charged state.
Figure 1B:
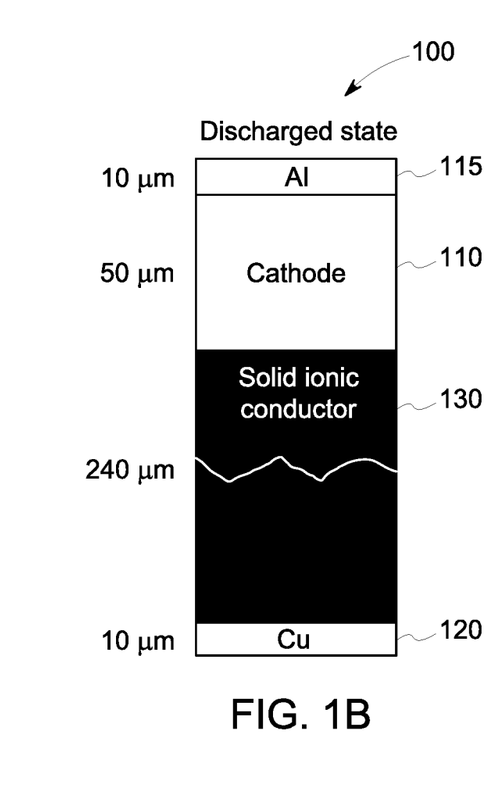
FIG. 1B is a schematic drawing of a conventional solid state battery in a discharged state.

In a conventional solid state battery cell, the solid electrolyte structure is formed from a dense ceramic material and is depicted in FIGS. 1A and 1B. FIGS. 1A and 1B show a conventional battery cell 100 having a cathode 110 with a thickness of about 50 micrometers and an aluminum current collector 115 having a thickness of about 10 micrometers, an anode 120 having a copper current collector and having a thickness of about 10 micrometers, and a solid ionic conductor or solid electrolyte 130 prepared from a dense ceramic material and having a thickness of about 240 micrometers. FIG. 1A depicts the solid state battery cell in a charged state and FIG. 1B depicts the solid state battery cell in a discharged state. As the battery charges, positive ions, such as lithium ions, move toward the anode and deposit a layer 150 of lithium metal on the anode 120. This added layer 150 of lithium metal creates a volume change within the battery cell during battery charging. The thickness of the battery in the discharged state shown in FIG. 1B is 310 micrometers; while the thickness of the battery in the charged state increases to about 320 micrometers due to the added layer 150 of lithium metal deposited on the anode (about 10 micrometers). Volume changes within a solid state battery cell result in stress within the cell. Uneven lithium deposition of lithium 150 between solid electrolyte 130 and anode 120 is associated with lithium dendrite formation in ceramic electrolytes during high current density charging.

Figure 2:
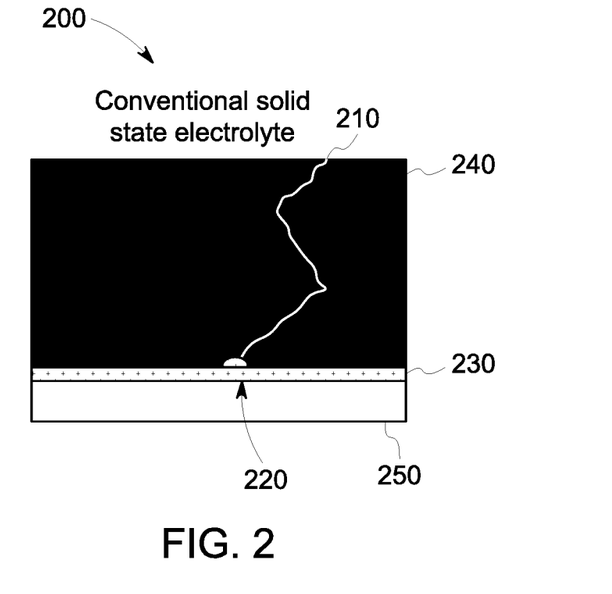
FIG. 2 is a schematic drawing of a portion of a conventional solid state battery.

Stress may build along the interface between the anode and the dense ceramic electrolyte as the lithium ions are reduced and deposited on the anode during charging and as the layer of lithium metal begins to push the anode away from the dense ceramic electrolyte. Where there is an imperfection on the interface between the electrode and electrolyte, a stress concentration is created as lithium metal deposit is formed at the site of the imperfection. Eventually, a crack in the electrolyte develops due to stress build up from continued lithium deposition, allowing the lithium metal to enter and form a dendrite. FIG. 2 depicts a conventional solid state battery cell 200 where a lithium dendrite 210 has formed at an imperfection 220 on an interface 230 between a dense ceramic electrolyte 240 and an anode 250.

In one aspect, a porous electrolyte structure for a solid state battery is provided. The porous electrolyte structure having a thickness and an interconnected ceramic matrix with a network of open pores disposed throughout the thickness of the porous electrolyte structure. The porous electrolyte structure including a porosity of about 20% by volume to about 80% by volume.

A solid electrolyte structure or solid ionic conductor is situated between the electrodes for conducting ions between the cathode and anode and is configured to move ions, such as lithium or sodium ions, while resisting the flow of electrons, which allows electrons to move outside the battery. In one aspect, the solid electrolyte structure is porous with an interconnected ceramic matrix and a network of open pores disposed throughout the solid electrolyte. The porous structure includes a plurality of open pores extending from the surface and disposed throughout the thickness of the solid state electrolyte. In one aspect, the ceramic matrix and the open pore network are continuous forming two interpenetrating continua.

The pores or void spaces may be uniform in size and shape or irregularly formed. In one aspect, the pores have an average pore diameter from about 50 nm to about 500 µm. In another aspect, the pores have an average pore diameter ranging from about 100 nm to about 500 µm. In another aspect, the pores have an average pore diameter from about 50 nm to about 500 nm.

In one aspect, the porous electrolyte structure has a porosity of about 20% by volume to about 80% by volume. In another aspect, the porous electrolyte has a porosity of about 20% by volume to about 70% by volume. In another aspect, the porosity may be about 30% by volume to about 80% by volume and in another aspect, the porosity may be from about 30% by volume to about 70% by volume. In another aspect, the porosity is 30% by volume to about 60% by volume, based on the volume of the porous electrolyte structure. In another aspect, the porosity may be about 50% by volume to about 80% by volume and in another aspect, the porosity may be from about 50% by volume to about 70% by volume. In another aspect, the porosity is from about 50% by volume to about 60% by volume. In one aspect, the electrolyte structure has a porosity of at least 30% by volume. In another aspect, the electrolyte structure has a porosity of at least 50% by volume.

The porous electrolyte structure with its open pore network provides the battery cell with empty spaces. During charging of the battery, as the metal ions deposit and are reduced on the anode and stress begins to build from the volume change in the battery cell, the metal can begin to fill the available empty spaces of the pores. This leads to a reduced volume change of the battery as a whole and limits any stress build-up formed at the interface of the anode and electrolyte. The reduction of the stress build-up reduces dendrite formation in the ceramic electrolyte even at high current densities.

Figure 3:
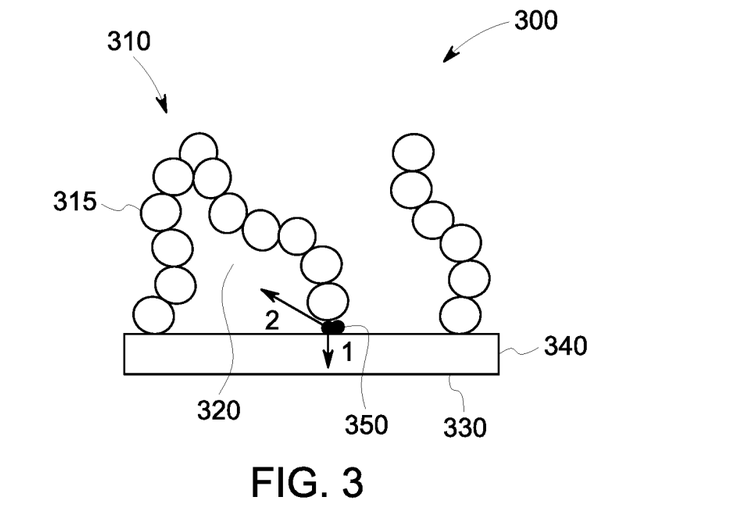
FIG. 3 is a schematic drawing of a portion of a solid state ceramic battery cell in accordance with an aspect of the disclosure.

FIG. 3 illustrates a portion of a solid state battery cell 300 during a charging cycle. The battery cell 300 has a porous electrolyte structure 310 with an interconnected ceramic matrix 315 and a network of open pores 320 extending from the surface and disposed throughout the thickness of the electrolyte structure. As the metal ions move towards the anode 330 and begin to deposit on the anode surface 340, the metal 350 can either push the solid-state electrolyte structure 310 away from the anode surface 340 or move into an open pore space 320. This relieves stress build-up at the interface of the anode surface 340 and the electrolyte structure 310 and reduces the chance of dendrite formation.

Figure 4A:
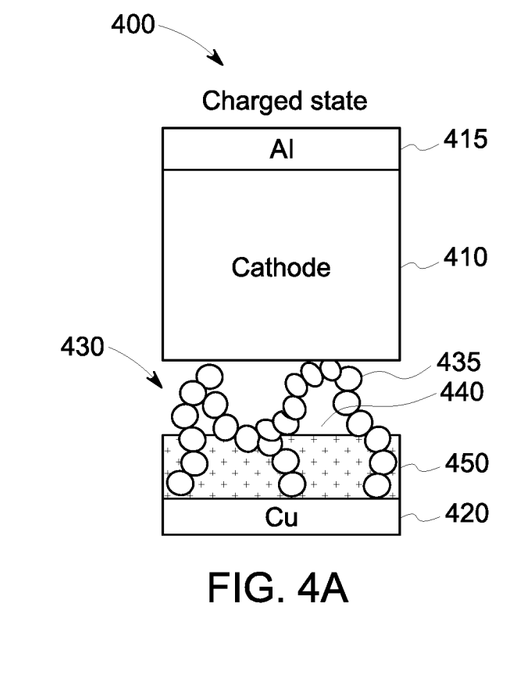
FIG. 4A is a schematic diagram of a solid state battery cell in a charged state in accordance with an aspect of the disclosure.
Figure 4B:
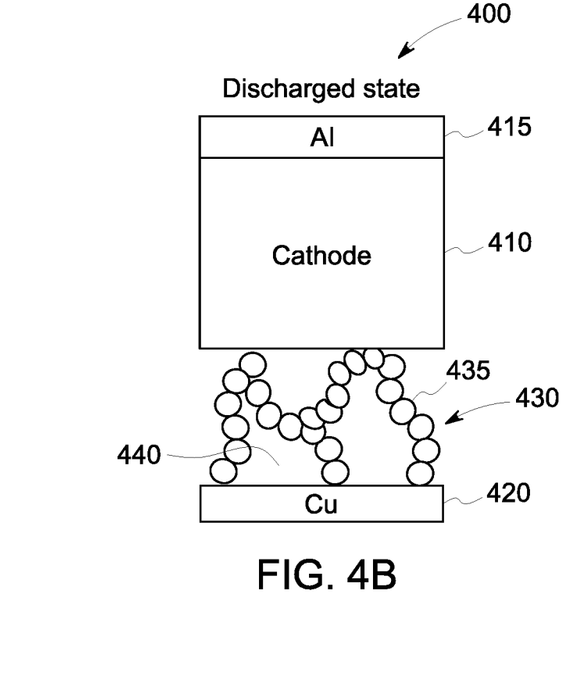
FIG. 4B is a schematic diagram of a solid state battery cell in a discharged state in accordance with an aspect of the disclosure.

With reference to FIGS. 4A and 4B, an aspect of a solid state battery cell is illustrated. FIG. 4A shows the battery in a charged state and FIG. 4B shows the battery in a discharged state. FIGS. 4A and 4B show a battery cell 400 having a cathode 410 with a thickness of about 50 micrometers and an aluminum current collector 415 having a thickness of about 10 micrometers, an anode 420 having a copper current collector and having a thickness of about 10 micrometers and a solid ionic conductor or porous electrolyte structure 430 prepared from a porous ceramic material and having a thickness of about 20 micrometers. The porous electrolyte structure 430 has an interconnected ceramic matrix 435 with a network of open pores 440 extending from the surface and disposed throughout the thickness of the electrolyte structure. As the battery charges, positive ions, such as lithium or sodium ions, move toward the anode and deposit as metal 450 on the anode 420 or fill the open pore spaces 440 in the electrolyte 430, which minimizes the overall volume change of the charged battery. The thickness of the battery in the discharged state shown in FIG. 4B is 90 micrometers; while the thickness of the battery in the charged state remains at about 90 micrometers. The reduced volume change in the battery cell between the charged and discharged states eliminates stress from concentration change and reduces dendrite formation.

In one aspect, the porous electrolyte structure includes a ceramic electrolyte material. The ceramic material may be any ceramic material having low electronic conductivity with a high ionic transference number, high ionic conductivity, mechanical strength, temperature stability and which is electrochemically stable with the electrode materials. In one aspect, the ceramic material has an ionic conductivity of above 104 S/cm at room temperature. In one aspect, the ceramic material includes, but is not limited to, NASICON-type (sodium super ionic conductor), garnet-type, perovskite-type, LISICON-type (lithium super ionic conductor-type), LiPON-type (lithium phosphorus oxynitride), lithium nitride-type, sulfide-type, agryrodite-type, anti-perovskite-type or mixtures thereof.

In one aspect, the NASICON-type material may include a NASICON-type Li-ion material. In another aspect, the garnet-type material may include a lithium-containing garnet material. In another aspect, the perovskite-type material may include lithium lanthanum titanate (LLTO), lithium strontium tantalum zirconium oxide (LSTZ), lithium strontium tantalum hafnium oxide (LSTH) or lithium strontium niobium zirconium oxide (LSNZ). In one aspect, the sulfide-type material may be lithium phosphorus sulfide (LPS).

In another aspect, the NASICON-type Li-ion material has the formula $LiM_2(PO_4)_3$, where M is Ti or Ge. In another aspect, the NASICON-type Li-ion material may be doped with aluminum or scandium. In one aspect, the lithium-containing garnet material may be lithium lanthanum zirconium oxide (LLZO). In another aspect, the LLZO has the formula $Li_7La_3Zr_2O_{12}$. In another aspect, LLZO may be doped with aluminum, tantalum or gadolinium. In one aspect, LLTO has the formula $Li_{3-x}La_{2/3-x}TiO_3$, where $0<x<2/3$. In another aspect, LSTZ has the formula $Li_{3/8}Sr_{7/16}Ta_{3/4}Zr_{1/4}O_3$. In another aspect, LSTH has the formula $Li_{3/8}Sr_{7/16}Ta_{3/4}Hf_{1/4}O_3$. In another aspect, LSNZ has the formula $Li_{3/8}Sr_{7/16}Nb_{3/4}Hf_{1/4}Zr_{1/4}O_3$. In one aspect, LISICON-type material has the formula $\gamma$-$Li_3PO_4$. In one aspect, the argyrodite-type material has the formula $Li_6PS_5X$, where X=Cl, Br or I. In another aspect, the anti-perovskite material is LiOX, where X=Cl, Br or I.

In one aspect, the ceramic material includes, but is not limited to: $LiTi_2(PO_4)_3$; $LiTi_2(PO_4)_3$-$0.2Li_3BO_3$; $Li_{1.3}Al_{0.3}Ti_{1.7}(PO_4)_3$; $Li_{1.3}M_{0.3}Ti_{1.7}(PO_4)_3$, where M is Al or Sc; $2[Li_{1.4}Ti_2Si_{0.4}P_{2.6}O_{12}]$-$AlPO_4$; $100[Li_{1.5}Cr_{0.3}Ti_{1.5}(PO_4)_3]$-$5SiO_2$; $Li_{1.5}Al_{0.5}Ge_{1.5}(PO_4)_3$; $Li_{1.5}Al_{0.5}Ge_{1.5}(PO_4)_3$-$0.05Li_2O$; $19.75Li_2O*6.17Al_2O_3*37.04GeO_2*37.04P_2O_5$; $Li_{1.5}Al_{0.4}Cr_{0.1}GE_{1.5}(PO_4)_3$; $Li_7La_3Zr_2O_{12}$; $Li_{6.75}La_3(Zr_{1.75}Nb_{0.25})O_{12}$; $Li_{7.06}La_3Y_{0.06}Zr_{1.94}O_{12}$; $Li_{6.4}La_3Zr_{1.4}Ta_{0.6}O_{12}$; $Li_{6.55}Ga_{0.15}La_3Zr_2O_{12}$; $Li_{6.4}Ga_{0.2}La_3Zr_2O_{12}$; $Li_{6.25}Ga_{0.25}La_3Zr_2O_{12}$; $Li_{6.20}Ga_{0.30}La_{2.95}Rb_{0.05}Zr_2O_{12}$; $Li_{6.65}Ga_{0.15}La_3Zr_{1.90}Sc_{0.10}O_{12}$; $Li_{0.35}La_{0.55}TiO_3$; $Li_{0.34(1)}La_{0.51(1)}TiO_{2.94(2)}$; $LiSr_{1.65}Zr_{1.3}Ta_{1.7}O_9$; $Li_{14}Zn(GeO_4)_4$; $Li_{3+x}Ge_xV_{1-x}O_4$, where $0<x<1$; $Li_{3.5}Ge_{0.5}V_{0.5}O_4$; $Li_{3.6}Ge_{0.6}V_{0.4}O_4$; $Li_{4-x}Si_{1-x}P_xO_4$, where $0<x<1$; $Li_{3.5}Si_{0.5}P_{0.5}O_4$; $Li_{3.4}Si_{0.4}P_{0.6}O_4$; $Li_{10.42}Si_{1.5}P_{1.5}Cl_{0.08}O_{11.92}$; $Li_{10.42}Ge_{1.5}P_{1.5}Cl_{0.08}O_{11.92}$; $Li_3PO_4$; $Li_3*2Li_2O$; $Li_3N$; $Li_9N_2Cl_3$; $3Li_3N*MI$, where M=Li, Na, K, Rb; $Li_4GeS_4$; $Li_{10}GeP_2S_{12}$; $Li_2S*P_2S_5$; $Li_{4.25+n}(Ge_{0.75-n}Ga_{0.25})S_4$, where $0<n<0.75$; $Li_{3.25}Ge_{0.25}P_{0.75}S_4$; $Li_{10}GeP_2S_{12}$; $Li_{10}GeP_2S_{11.7}O_{0.3}$;

$Li_{9.54}Si_{1.74}P_{1.44}S_{11.7}Cl_{0.3}$; $70Li_2S$-$30P_2S_5$ glass; $70Li_2S$-$30P_2S_5$ glass-ceramic; $0.23B_2S_5$-$0.10P_2S_5$-$0.67Li_2S$ glass; $75Li_2S*25P_2S_5$ glass; $75Li_2S*25P_2S_5$ glass-ceramic; $80Li_2S*20P_2S_5$ glass; $80Li_2S*20P_2S_5$ glass-ceramic; $Li_6PS_5Cl$; $Li_6PS_5Br$; $Li_6PS_5I$; $Li_{2x}SiP_2S_{7+x}$ where $10<x<12$; $Li_3OCl$; $Li_3OCl_{0.5}Br_{0.5}$; $Li_{2.99}Ba_{0.005}ClO$; $Li_{6.5}La_3Zr_{2-x}Al_xO_{12}$, where $0<x<1$; $Li_{6.5}La_3Zr_{2-x}Ta_xO_{12}$, where $0<x<1$; and mixtures thereof.

The solid electrolyte material may include additional materials, such as lithium borate, lithium phosphate, lithium titanium phosphate, lithium tetraborate ($Li_2B_4O_7$), lithium carbonate ($Li_2CO_3$) and eutectic flux materials, such as LiCl:KCl, $SrCl_2$:LiCl and $CaCl_2$:LiCl.

The porous ceramic solid state electrolyte structure may be manufactured with the battery cell allowing the electrolyte structure to be thinner than if it were manufactured separately and required a thicker supporting structure. In one aspect, the porous electrolyte structure has a thickness of 100 micrometers or less. In another aspect, the electrolyte structure has a thickness ranging from about 10 micrometers to about 100 micrometers. In another aspect, the electrolyte structure has a thickness in a range of from about 10 micrometers to about 50 micrometers. In another aspect, the electrolyte structure has a thickness from about 10 micrometers to about 30 micrometers. In another aspect, the electrolyte structure is about 18 micrometers to 20 micrometers thick.

In one aspect, the solid state electrolyte structure includes a coating covering the interconnected ceramic matrix forming the open pore network. The coating includes ionically insulating material to ensure that the lithium ions are reduced to metal at the solid state electrolyte interface with the anode or with an anode interface layer (described below) if present. This causes the metal to extrude up from the anode or anode interface layer into the pores rather than to grow out from the sides of the ceramic matrix without filling in the open pore spaces. In one aspect, the ionically insulating material has an ionic conductivity value that is less than 10% of the ionic conductivity of the solid state electrolyte material. In one aspect, the coating covers the interconnected ceramic matrix of the porous electrolyte structure without closing or filling up the pore spaces. In one aspect, there is no coating between the anode and the solid state electrolyte, which would prevent contact between the metal ions and electrons from the current collector. In one aspect, there is no coating between the cathode and the solid state electrolyte, which would prevent metal ions from transferring between the cathode and the solid state electrolyte. In one aspect, the coating has a thickness of up to about 1 μm. In another aspect, the coating has a thickness of about 50 nm to about 1 μm. In one aspect, the coating is lithium carbonate.

Figure 5A:
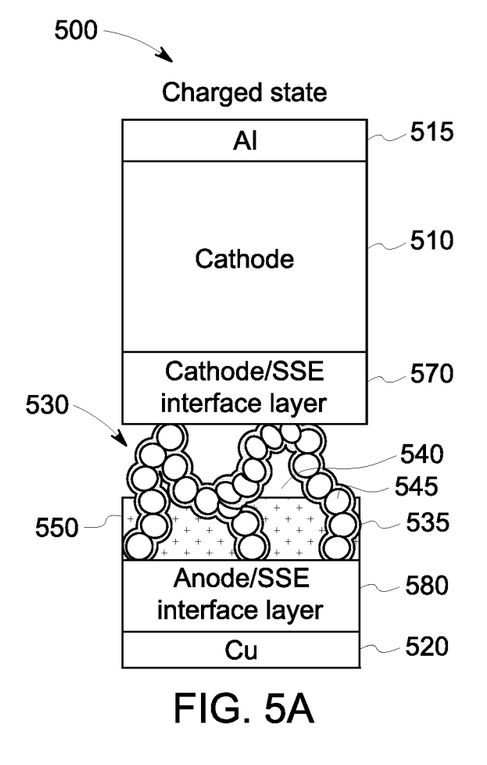
FIG. 5A is a schematic diagram of a solid state battery cell in a charged state in accordance with an aspect of the disclosure.
Figure 5B:
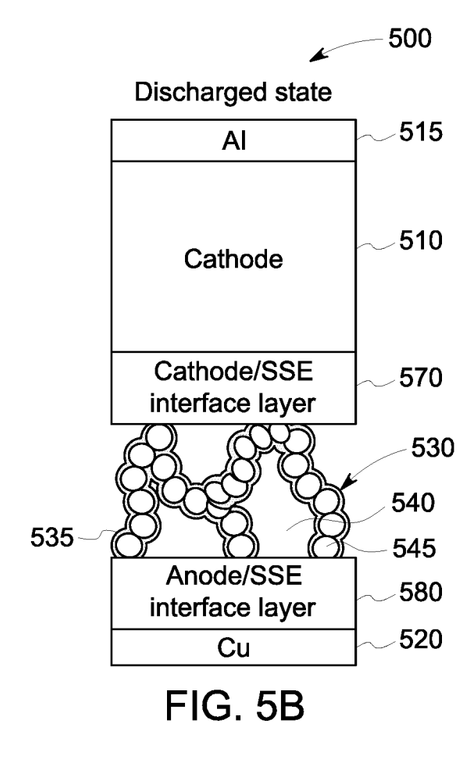
FIG. 5B is a schematic diagram of a solid state battery cell in a discharged state in accordance with an aspect of the disclosure.

With reference to FIGS. 5A and 5B, an aspect of the solid state battery cell is illustrated. FIG. 5A shows the battery in a charged state and FIG. 5B shows the battery in a discharged state. FIGS. 5A and 5B show a battery cell 500 having a cathode 510 with an aluminum current collector 515, an anode 520 having a copper current collector and a solid ionic conductor or porous electrolyte structure 530 prepared from a porous ceramic material. The porous electrolyte structure 530 has an interconnected ceramic matrix 545 with a network of open pores 540 extending from the surface and disposed throughout the thickness of the electrolyte structure 530. An ionically insulating coating 535 covers the ceramic matrix 545. In the charged state, ions, such as lithium or sodium ions, move toward the anode and are reduced and deposit as metal 550 on the anode 520 and into the open pore spaces 540 in the porous electrolyte structure 530.

In one aspect, the solid state battery cell includes a cathode or positive electrode including a metal or metal alloy current collector and a cathode metal ion-conducting material, such as a cathode lithium ion-conducting material or cathode sodium ion-conducting material. Wires can be attached to the current collector to provide a path for electron flow from an external circuit. In one aspect, the current collector is a conducting metal or metal alloy. In another aspect, the current collector is aluminum. In one aspect, the current collector has a thickness of about 10 micrometers to about 20 micrometers.

In one aspect, the cathode material includes, but is not limited to $LiTiS_2$; $LiCoO_2$; $LiNiO_2$; $LiMnO_2$; $LiNi_{0.33}Mn_{0.33}Co_{0.33}O_2$; $LiNi_{0.8}Co_{0.15}Al_{0.05}O_2$, $Li_2MnO_3$; $LiMn_2O_4$; $LiCo_2O_4$; $LiFePO_4$; $LiMnPO_4$; $LiCoPO_4$; $LiFeSO_4F$; $LiVPO_4F$; $FeF_2$; $FeF_3$; $CoF_2$; $CuF_2$; $NiF_2$; $BiF_3$; $FeCl_3$; $FeCl_2$; $CoCl_2$; $NiCl_2$; $CuCl_2$; AgCl; LiCl; S; $Li_2S$; Se; $Li_2Se$; Te; I; LiI, and combinations thereof. In another aspect, the cathode is a lithium iron phosphate infiltrated with liquid electrolyte.

In another aspect, the cathode contains additives, such as carbon to increase electrical conductivity. In another aspect, the cathode contains binder materials. In another aspect, the cathode is coated on the current collector.

In one aspect, the cathode material has a thickness of about 50 micrometers to about 100 micrometers. In one aspect, the cathode may have a thickness of about 60 micrometers to about 120 micrometers.

In one aspect, the solid state battery cell includes an anode or negative electrode including a metal or metal alloy current collector. In one aspect, the anode may include a current collector coated with a metal, such as lithium metal or sodium metal. Wires can be attached to the current collector to provide a path for electron flow from an external circuit. In one aspect, the current collector is a conducting metal or metal alloy. In another aspect, the current collector is copper. In one aspect, the current collector has a thickness of about 10 micrometers.

In one aspect, the solid state battery cell includes a solid state electrolyte interface layer between the electrode and the porous electrolyte structure. A solid state electrolyte interface layer disposed between an electrode and electrolyte helps to improve the contact between the electrode (cathode or anode) and the porous electrolyte structure. In one aspect, the battery cell includes a cathode interface layer between the cathode and the porous electrolyte structure. In another aspect, the battery cell includes an anode interface layer between the anode and the porous electrolyte structure. FIGS. 5A and 5B discussed previously show a solid state battery cell with a cathode interface layer 570 between the cathode 510 and the porous electrolyte structure 530 and an anode interface layer 580 between the anode 520 and the porous electrolyte structure 530.

The interface layers can improve the contact between the SSE and the current collector. They can be ionically conductive, electrically conductive or both. They may be prepared from any conventional material used for making interface layers. In one aspect, the interface layers may be solid polymer electrolyte, such as polyethylene oxide with bis(trifluoromethylsulfonyl)amine lithium salt or a combination of other lithium salt compounds. In one aspect, the interface layer may be a membrane. In another aspect, the interface layer may be a lithophilic coating, such as aluminum oxide. In yet another aspect, the interface layer may be formed from a polymer gel electrolyte. In one aspect, the interface layer may be applied by atomic layer deposition. In one aspect, the SSE may interpenetrate into the interface layers.

In one aspect, the interface layer may have a thickness of about 10 nm to about 170 micrometers. In another aspect, the interface layer may be a coating having a thickness from about 10 nm to about 100 nm. In another aspect, the interface layer has a thickness from about 150 micrometers to about 170 micrometers.

In one aspect, additional metal, such as sodium or lithium may be added to the solid state battery cell during manufacture and prior to operation to provide the battery cell with more metal than can be provided by the cathode material. In one aspect, additional metal can be placed between the anode current collector and the porous electrolyte structure.

In another aspect, the additional metal can be placed between the anode current collector and an anode interface layer. In these aspects, during battery cycling, erosion of the additional metal can also occur moving the metal into the porous electrolyte structure.

In another aspect, the additional metal can be placed between the cathode and the porous electrolyte structure. In another aspect, the additional metal can be placed between the cathode and a cathode interface layer. In these aspects, during battery cycling, the additional metal can also move into the open pores of the porous electrolyte structure or to a position between the porous electrolyte structure and the anode or into either position.

Figure 6A:
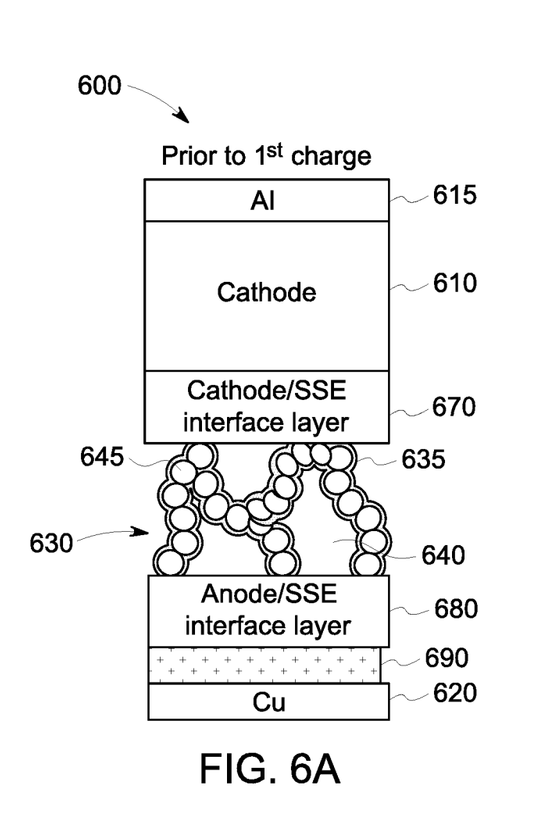
FIG. 6A is a schematic diagram of a solid state battery cell prior to initial charge in accordance with an aspect of the disclosure.
Figure 6B:
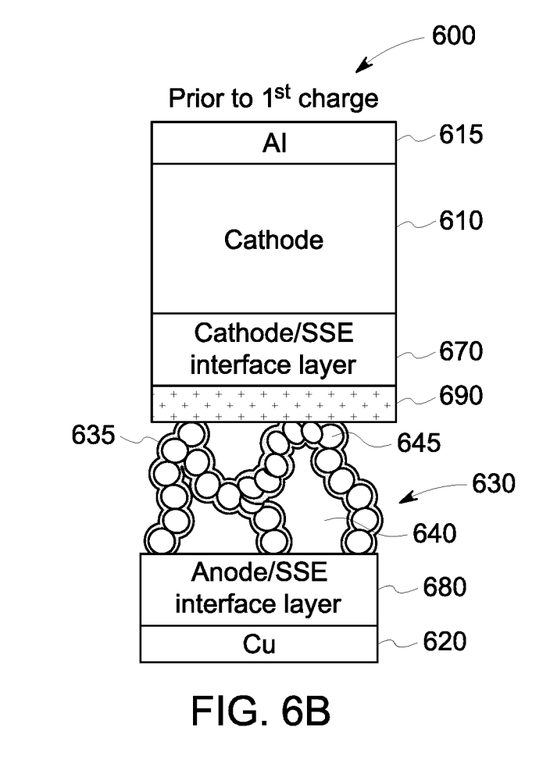
FIG. 6B is a schematic diagram of a solid state battery cell prior to initial charge in accordance with an aspect of the disclosure.

With reference to FIGS. 6A and 6B, different aspects of the solid state battery cell are illustrated prior to an initial battery charge. FIGS. 6A and 6B show a battery cell 600 having a cathode 610 and an aluminum current collector 615, a cathode interface layer 670, an anode 620 having a copper current collector, an anode interface layer 680 and a solid ionic conductor or porous electrolyte structure 630 prepared from a porous ceramic material. The porous electrolyte structure 630 has an interconnected ceramic matrix 645 with a network of open pores 640 extending from the surface and disposed throughout the thickness of the electrolyte structure 630. An ionically insulating coating 635 covers the ceramic matrix 645. In FIG. 6A, additional metal 690, such as lithium or sodium, is positioned in the battery cell between the anode 620 and the anode interface layer 680. In FIG. 6B, additional metal 690 is positioned in the battery cell between the cathode interface layer 670 and the porous electrolyte structure 630.

In one aspect, a method for producing a solid state battery cell is provided. The method includes forming a porous electrolyte structure having a thickness and an interconnected ceramic matrix with a network of open pores disposed throughout the thickness of the porous electrolyte structure and inserting the porous electrolyte structure between an anode and a cathode. The porous electrolyte structure includes a porosity of about 20% by volume to about 80% by volume, based on the volume of the porous electrolyte structure.

The porous electrolyte may be manufactured together with the solid state battery cell, rather than in a separate process. Manufacturing the porous electrolyte with the solid state battery cell allows the porous electrolyte to be thinner and reduces the manufacturing costs of the battery cell. In one aspect, the electrolyte material is applied to the anode, such as a copper foil. In another aspect, the electrolyte material is coated on the anode.

In another aspect, the electrolyte material is applied to the anode as a slurry with a solvent. In another aspect, the electrolyte material is heat treated. In another aspect, the electrolyte material is heat treated at about 850° C. In another aspect, the electrolyte material is heat treated for about 2 hours.

In one aspect, the ceramic matrix of the porous electrolyte structure is coated with lithium carbonate. In one aspect, the ceramic matrix is coated by infiltrating the porous electrolyte structure with carbon dioxide. The carbon dioxide gas reacts with the ceramic material to form a coating on the ceramic matrix. In one aspect, the coating on the ceramic matrix is up to about 1 µm thick. In another aspect, the coating has a thickness of about 500 nm to about 1 µm. Coating for the electrolyte structure can be formed by flowing carbon dioxide gas through the electrolyte structure. In one aspect, the coating is lithium carbonate.

In another aspect, the solid ceramic electrolyte structure includes a porous portion and a dense portion. In one aspect, the porous portion is disposed between the anode and the dense portion of the solid electrolyte. The porous portion has an interconnected ceramic matrix with a network of pores disposed throughout the porous portion as described above and may be configured to hold anode material within the pores when the battery cell is in a charged state. In one aspect, the dense portion includes a porosity of about 80% by volume to about 100% by volume. In another aspect, the dense portion includes a porosity of about 80% by volume to about 95% by volume. In another aspect, the dense portion includes a porosity of about 80% by volume to about 90% by volume.

Figure 7A:
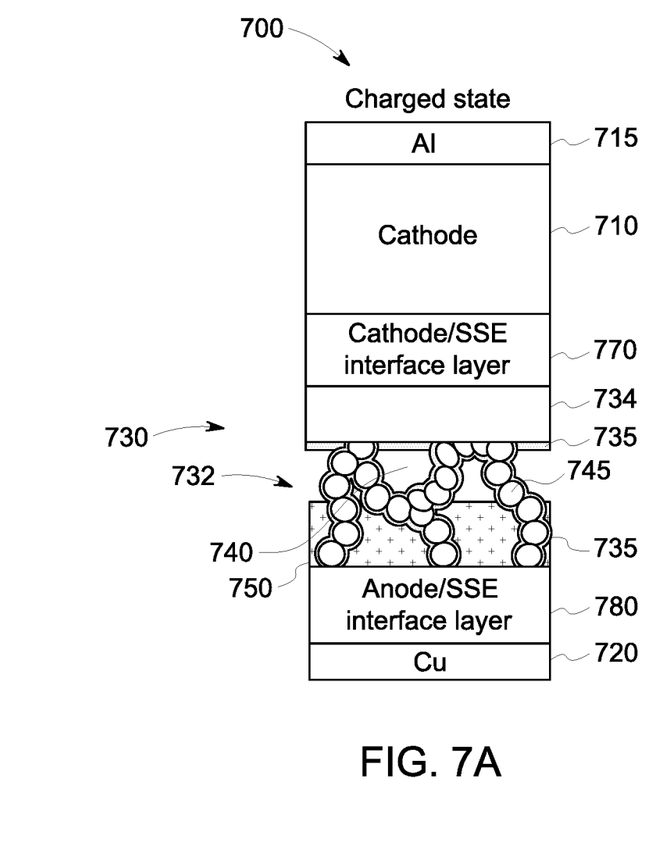
FIG. 7A is a schematic diagram of a solid state battery cell in a charged state in accordance with an aspect of the disclosure.
Figure 7B:
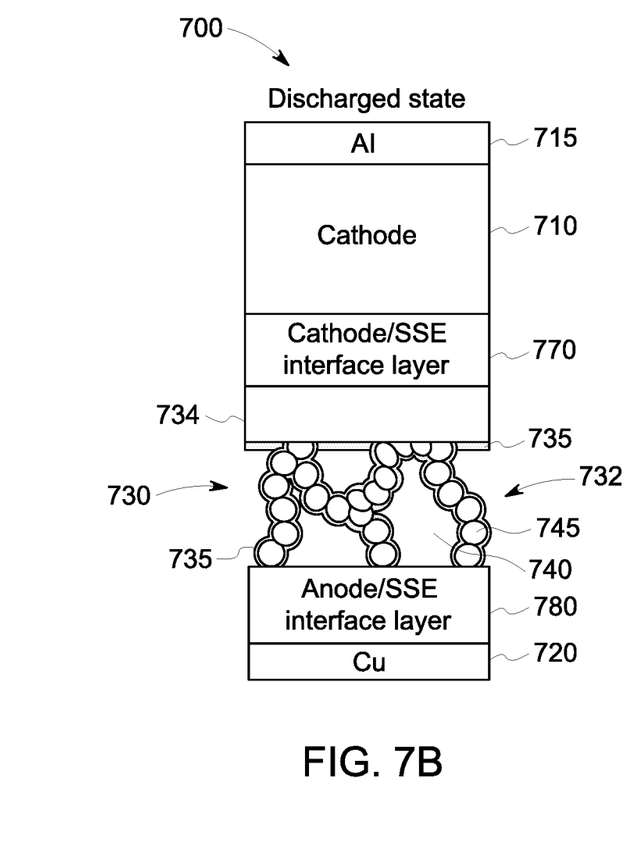
FIG. 7B is a schematic diagram of a solid state battery cell in a discharged state in accordance with an aspect of the disclosure.

With reference to FIGS. 7A and 7B, an aspect of a solid state battery cell is illustrated. FIG. 7A shows the battery in a charged state and FIG. 7B shows the battery in a discharged state. FIGS. 7A and 7B show a battery cell 700 having a cathode 710 and an aluminum current collector 715, an anode 720 having a copper current collector and a solid ceramic electrolyte structure 730 including a porous portion 732 and a dense portion 734. The porous portion 732 has an interconnected ceramic matrix 745 with a network of open pores 740 extending from the surface and disposed throughout the thickness of the porous portion 732. An ionically insulating coating 735 covers the ceramic matrix 745. A cathode interface layer 770 between the cathode 710 and the dense portion 734 and an anode interface layer 780 between the anode 720 and the porous portion 732. In the charged state, ions, such as lithium or sodium ions, move toward the anode and are reduced and deposit as metal 750 on the anode 720 and into the open pore spaces 740 in the porous portion 732.

In one aspect, the battery cell may be assembled by applying a cathode to the porous electrolyte, such that the electrolyte is between the cathode and anode and contacts the cathode and anode. In one aspect, additional layers may be included in the battery cell. In one aspect, the battery cell may include a cathode interface layer, which is sandwiched between the cathode and porous electrolyte structure during the battery cell assembly. In another aspect, the battery cell includes an anode interface layer, which is sandwiched between the anode and the porous electrolyte structure during the battery cell assembly.

The porous electrolyte structure and the battery cell may be made into any suitable shape.

The foregoing may be better understood by reference to the following examples, which are presented for purposes of illustration and are not intended to limit the scope of the disclosure in any way.

EXAMPLES

Electrode Preparation:

Cathode: LiFePO$_4$ (LFP) coated (83 micrometers thickness) on an Aluminum electrode (20 micrometers thickness) backing from MTI Corp.

Anode: 5 mil thick copper disks (10 micrometers thickness) were cleaned and etched for 15-20 s in a 20 wt % ammonium persulfate aqueous solution to prepare the anode.

Electrolyte Materials and Preparation:

Material: Al-doped lithium lanthanum zirconium oxide (Al-LLZO) ceramic nano-powder with a D50=412 nm from Ampcera Slurry A was prepared by dispersing the electrolyte material in ethylene glycol (60 wt % solids loading) to form a homogeneous slurry.

Slurry B was prepared by adding 8 wt % Li$_3$BO$_3$ sieved below 25 micrometers and mixing with the Al-LLZO nano-powder before the addition of ethylene glycol. The solids loading of the slurry was lowered to 49-50 wt % to obtain a homogeneous slurry.

Slurry A was coated onto 5 mil thick copper disks (anode material) using a doctor blade with a 5 mil gap. Slurry B was coated onto different 5 mil thick copper disks (anode material) using a doctor blade with a 5 mil gap. The coated copper disks were dried in a vacuum oven (20-25 mm Hg) at 115° C. overnight and then pressed at 9 Ton between two highly polished hardened steel plates, using a manual press. The coated Copper disks were heat treated for 2 hours at 850° C. in a quartz tube furnace under an Argon atmosphere. The electrolyte thickness is 20 micrometers.

After heat treatment, the ceramic coated disks were immediately stored in an inert atmosphere in order to prevent surface carbonation.

PEO+LiTFSl Membrane

Polyethylene oxide (Mv=600,000, from Sigma Aldrich) is dissolved in a solution of bis(trifluoromethylsulfonyl)amine lithium salt (Sigma Aldrich) in MeCN to obtain a 15 wt % solids loading solution with an ethylene oxide/Li molar ratio of 8.

Approximately 14 g of this viscous solution is poured on a flat Teflon sheet to cover an area of 78.5 cm$^2$ and allowed to dry. Then discs of the desired area are punched out. The obtained thickness of the PEO+LiTFSl membrane is 150-170 micrometers.

Cells Assembly:

The CR 2032 cells were assembled in an Argon environment by sandwiching the PEO+LiTFSI membrane between the prepared ceramic coated disk and cathode.

Total cell thickness ranged from 283 micrometers to 303 micrometers.

Figure 8:
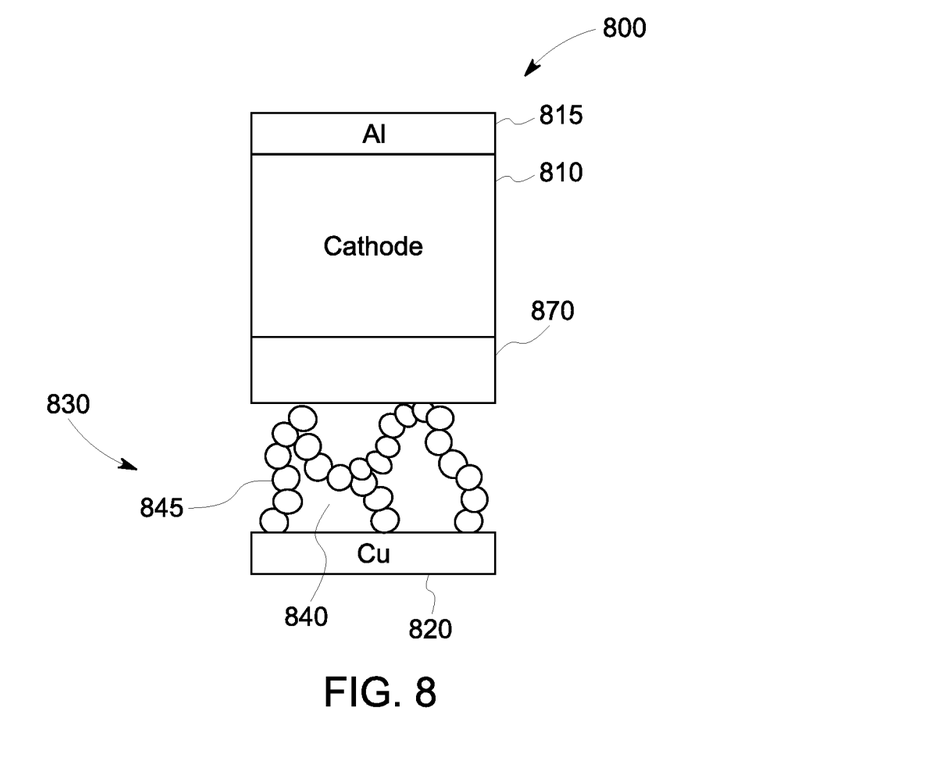
FIG. 8 is a schematic diagram of the solid state battery cell assembly prepared in the Examples.

Cell assembly for the Example is shown in FIG. 8. FIG. 8 shows a solid state battery cell 800 having a cathode 810 and an aluminum current collector 815, a cathode interface layer 870, an anode 820 having a copper current collector and a solid ionic conductor or porous electrolyte structure 830 prepared from a porous ceramic material. The porous ceramic material is Al-LLZO+Li$_3$BO$_3$ from slurry B. The porous electrolyte structure 830 has an interconnected ceramic matrix 845 with a network of open pores 840 extending from the surface and disposed throughout the thickness of the electrolyte structure 830.

Coin Cell Testing Protocol and Results:

Cells were tested at 60° C. Different versions were made and cycled.

Formation cycles 3×, in each cycle, about 1 μm Li is transported from the LFP cathode to the copper anode. Constant Current density: 0.01 mA/cm$^2$ for 1 hour; Constant Current density: 0.025 mA/cm$^2$ for 1 hour; Constant Current density: 0.05 mA/cm$^2$ for 1.3 hour.

Figure 9:
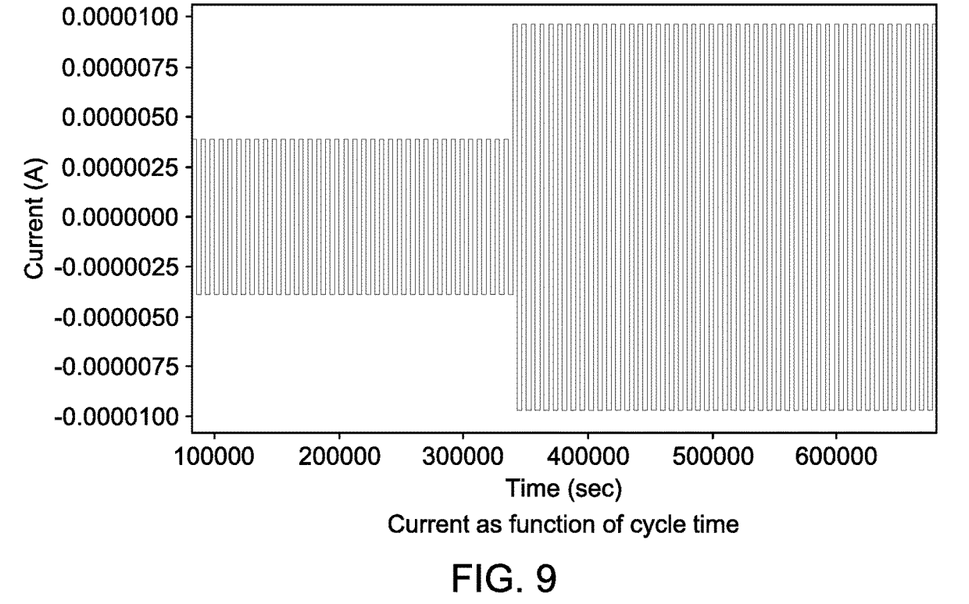
FIG. 9 is a graph showing current (A) as a function of cycle time (s) from the testing cycles in the Examples.
Figure 10:
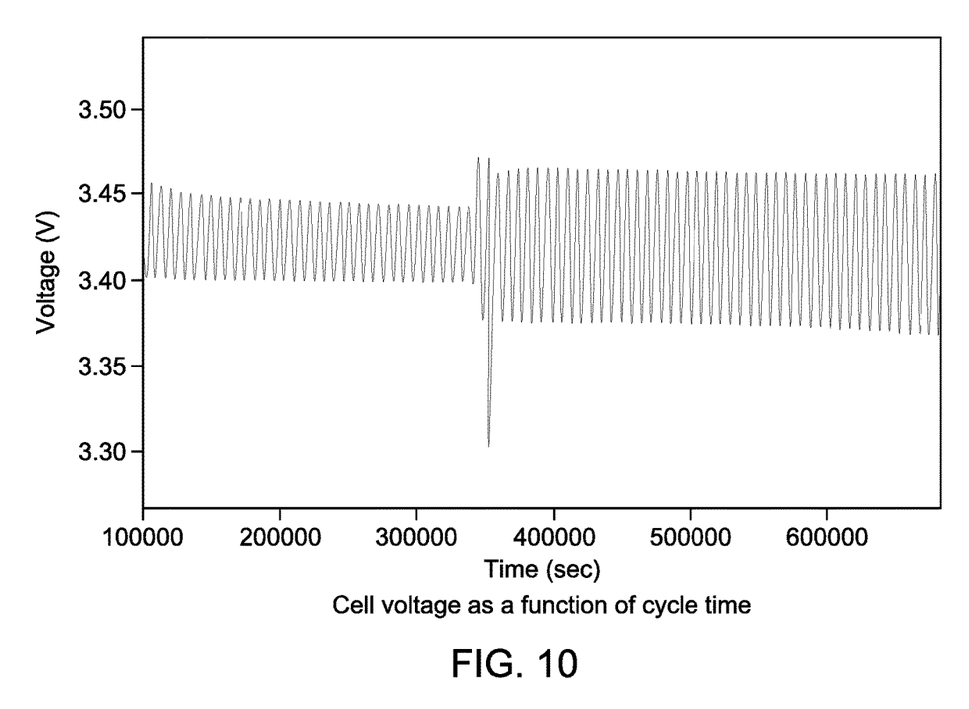
FIG. 10 is a graph showing cell voltage (V) as a function of cycle time (s) from the testing cycles in the Examples.

Testing Cycles: 2 current densities: 0.025 and 0.05 mA/cm$^2$. Results for slurry B are shown in FIG. 9 and FIG. 10. FIG. 9 is a graph showing Current (A) as a function of cycle time (s). FIG. 10 is a graph showing Voltage (V) as a function of cycle time (s).

This written description uses examples to explain the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A solid state electrolyte for a solid state battery, the solid state electrolyte consisting of a porous electrolyte structure having a thickness and an interconnected ceramic matrix with a network of open pores disposed throughout the thickness of the porous electrolyte structure, wherein the ceramic matrix and the network of open pores form two interpenetrating continua throughout the thickness of the porous electrolyte structure, and wherein the porous electrolyte structure comprises a porosity of about 20% by volume to about 80% by volume.

2. The porous electrolyte structure of claim 1, wherein the open pores have an average pore diameter from about 50 nm to about 500 μm.

3. The porous electrolyte structure of claim 1, wherein the ceramic matrix is selected from the group consisting of sodium super ionic conductor (NASICON), garnet, perovskite, lithium super ionic conductor (LISICON), lithium phosphorus oxynitride, lithium nitride, sulfide, argyrodite, anti-perovskite and mixtures thereof.

4. The porous electrolyte structure of claim 1, wherein the ceramic matrix is lithium lanthanum zirconium oxide.

5. The porous electrolyte structure of claim 3, wherein the ceramic matrix further comprises lithium borate.

6. The porous electrolyte structure of claim 1, wherein the porous electrolyte structure has a thickness ranging from about 10 micrometers to about 100 micrometers.

7. The porous electrolyte structure of claim 1, wherein the ceramic matrix comprises an ionically insulating coating.

8. The porous electrolyte structure of claim 7, wherein the ionically insulating coating comprises lithium carbonate.

9. A solid state battery cell comprising a cathode, an anode and a solid state electrolyte disposed between the cathode and the anode, the solid state electrolyte consisting of a porous electrolyte structure having a thickness and an interconnected ceramic matrix with a network of open pores disposed throughout the thickness of the porous electrolyte structure, wherein the ceramic matrix and the network of open pores form two interpenetrating continua throughout the thickness of the porous electrolyte structure, and wherein the porous electrolyte structure comprises a porosity of about 20% by volume to about 80% by volume.

10. The solid state battery cell of claim 9, wherein the ceramic matrix is selected from the group consisting of sodium super ionic conductor (NASICON), garnet, perovskite, lithium super ionic conductor (LISICON), lithium phosphorus oxynitride, lithium nitride, sulfide, argyrodite, anti-perovskite and mixtures thereof.

11. The solid state battery cell of claim 9, wherein the ceramic matrix comprises an ionically insulating coating.

12. The solid state battery cell of claim 9 further comprising a solid state electrolyte interface layer between the anode or the cathode and the porous electrolyte structure.

13. The solid state battery cell of claim 12, wherein the solid state electrolyte interface layer is a cathode interface layer between the cathode and the porous electrolyte structure.

14. The solid state battery cell of claim 12, wherein the solid state electrolyte interface layer is an anode interface layer between the anode and the porous electrolyte structure.

15. The solid state battery cell of claim 12 further comprising metal located between the anode and the porous electrolyte structure prior to a first charge cycle.

16. The solid state battery cell of claim 12 further comprising metal located between the cathode and the porous electrolyte structure prior to a first charge cycle.

17. A method for producing a solid state battery cell, the method comprising: forming a solid state electrolyte consisting of a porous electrolyte structure having a thickness and an interconnected ceramic matrix with a network of open pores disposed throughout the thickness of the porous electrolyte structure and inserting the solid state electrolyte between an anode and a cathode, wherein the ceramic matrix and the network of open pores form two interpenetrating continua throughout the thickness of the porous electrolyte structure, and wherein the porous electrolyte structure has a porosity of about 20% by volume to about 80% by volume.

18. The method of claim 17, wherein the ceramic matrix is selected from the group consisting of sodium super ionic conductor (NASICON), garnet, perovskite, lithium super ionic conductor (LISICON), lithium phosphorus oxynitride, lithium nitride, sulfide, argyrodite, anti-perovskite and mixtures thereof.

19. The method of claim 17, wherein fabricating a porous electrolyte structure comprises applying a coating comprising a ceramic material on the anode, wherein the coating has a thickness ranging from about 10 micrometers to about 100 micrometers.

20. The method of claim 17, wherein an ionically insulating coating is formed on the ceramic matrix by infiltrating the porous electrolyte structure with carbon dioxide.

21. D) A solid state battery cell comprising a cathode, an anode and a solid ceramic electrolyte structure disposed between the cathode and the anode, the solid ceramic electrolyte structure comprising a porous portion and a dense portion, the porous portion disposed between the anode and the dense portion of the solid electrolyte, wherein the porous portion has an interconnected ceramic matrix with a network of pores disposed throughout the porous portion and configured to hold anode material within the pores when the battery cell is in a charged state, the porous portion comprises a porosity of about 20% by volume to about 80% by volume, the dense portion comprises a porosity of about 80% by volume to about 100% by volume and the ceramic matrix comprises an ionically insulating coating, and wherein the ceramic matrix and the network of open pores form two interpenetrating continua throughout the thickness of the porous electrolyte structure.

* * * * *